Patented Jan. 6, 1948

2,434,204

UNITED STATES PATENT OFFICE 2,434,204

PREVENTION OF DETERIORATION OF GRAIN

Charles G. P. Feachem, Northwich, England, assignor to Imperial Chemical Industries Limited, a corporation of Great Britain No Drawing. Application May 20, 1944, Serial No. 536,643. In Great Britain May 20, 1943

6 Claims. (Cl. 99—153)

This invention relates to a new and improved method of preventing the deterioration of grain or pulses on storage by the use of a particular form of alumina, and to a method of providing the alumina in the required form.

On prolonged storage, particularly in humid conditions, grain and pulses frequently become infested with a number of pests and insects such as various forms of weevils, beetles and moths, of which the principal one is the grain weevil. This applies to many forms of grain and pulses and it is known that these pests can be destroyed by fumigation, dehydration or treatment with certain mineral dusts. Fumigation is not always readily applied and does not prevent subsequent reinfestation, and for dehydration to be effective it involves storage under dry conditions. The known mineral dusts have to be applied in quantities of about 1% of the weight of the grain if they are to be effective in destroying the weevils at a greater rate than their rate of propagation, and such quantities cause a dust nuisance when milling the grain. In such quantities finely ground naturally occurring corundum and bauxite are fairly effective in destroying these pests. We have now found that $\gamma$-alumina prepared by a particular process is effective even in small quantities in preventing the growth of and killing grain weevils and other insect pests in grain and pulses.

According to the present invention, the deterioration of grain or pulses by insects on storage is prevented by a process which comprises incorporating therein a small proportion, preferably between 0.05% and 0.5%, of $\gamma$-alumina prepared by precipitating aluminium hydroxide from an alkaline sodium aluminate solution by diluting it or by mixing it with sodium bicarbonate solution, preferably under conditions which give a fine but non-gelatinous precipitate, separating and washing the precipitate, drying the precipitate and activating it by heating at a temperature between 250° and 500° C. for between 24 and 2 hours preferably in a current of hot air, and pulverising it to give a particle size substantially below 10 microns.

The sodium aluminate solution may be obtained by dissolving commercial sodium aluminate containing 1.2–1.4 moles of $Na_2O$ per mole of $Al_2O_3$ in water to give a solution containing the equivalent of 15–20% $Al_2O_3$ by weight and 15–22% NaOH by weight, and is preferably kept at a temperature exceeding 50° C. The sodium aluminate solution may also be obtained by extracting alumina from bauxite by stirring it with hot 40–45% caustic soda solution until the solution contains 10–20% $Al_2O_3$ and filtering off insoluble matter. Aluminium hydroxide is precipitated from such solutions by mixing with sufficient water to reduce the caustic alkalinity below 10% NaOH, or by mixing with enough sodium bicarbonate solution to convert all or most of the caustic alkalinity into sodium carbonate. In this precipitation it is desirable (in order to simplify pulverization) to control the conditions so that the precipitate obtained is neither gelatinous nor in crystals which exceed 10 microns in size. Gelatinous precipitates are obtained by rapid precipitation within a few minutes, and coarse crystals are obtained by slow precipitation and ageing during several days at an elevated temperature such as 60°–80° C.; it is desirable to avoid both these extremes. Suitable control is obtained by inter alia causing the precipitation to occur substantially over a period of 1–24 hours, and carrying out the precipitation in the presence of previously precipitated aluminium hydroxide seed with vigorous stirring, preferably at a temperature of 30°–60° C. The mixing is carried out by adding the sodium aluminate solution to water or sodium bicarbonate solution respectively, or vice versa, while stirring, or by running the requisite liquors into a stirred precipitation vessel simultaneously either in batches or continuously. The dilution method only precipitates some 30–60% of the alumina in the sodium aluminate solution, the remainder being soluble in the residual dilute caustic soda solution; the greater the dilution the greater is the proportion of alumina precipitated. Use of sodium bicarbonate solution in a quantity sufficient to convert substantially all the caustic alkalinity to carbonate, precipitates over 90% of the alumina.

The precipitate is separated and washed by settling or filtering, gently agitating it with water and again settling or filtering, and repeating these steps until the wet solid so obtained contains less than 2.5 parts of NaOH per 100 parts of $Al_2O_3$ and preferably less than 0.5 part. It is desirable but not essential to use distilled water for the washing, or water which does not contain more than 10 parts per million of total hardness.

The precipitate is then dried by heating it to a temperature exceeding 80° C. and activated by further heating at a temperature between 250° and 500° C., preferably between 350° and 450° C. The total time of heating required varies between about 24 hours at 250° C. and 2 hours at 500° C., but longer times may be used if desired. The heating is most easily carried out with free access of air to as much as possible of the material, preferably by pasisng a current of hot air or allowing free circulation of air through the heating zone, as this provides the easiest method of removing the water. The activated material is generally in the form of large lumps which must be broken down to a suitable particle size, and it usually contains between 1% and 10% of total water when freshly activated, but the water content may rise during storage even up to 15–20%. X-ray examination shows it to be γ-alumina generally containing some boehmite in proportion depending partly on the water content. The activated material may vary in consistency from white soft chalky lumps which are readily disintegrated to quite hard white lumps. The chalky material merely requires gently pulverising to break it down into particles of size substantially below 10 microns and with a major number of particles below 2 microns, and suitable for use as grain dusts. The hard lumps on the other hand require severe pulverising of which the preferred treatment is wet ballmilling for 20–50 hours followed by drying. The hard lumps are obtained when the aluminium hydroxide before drying is in a gelatinous form; the soft chalky lumps are obtained when the aluminium hydroxide before drying is in a granular and compact form. In making the granular and compact aluminium hydroxide, however, the formation of individual crystals exceeding 5–10 microns should be avoided as far as possible because such crystals after activation must be broken down by wet ballmilling and subsequently dried.

The manufacture of γ-alumina by this process can also be made continuous by continuously adding the solutions to a stirred precipitation vessel and continuously separating and washing the precipitate. The material may be dried and activated in a kiln, rotary drier or oven.

The forms of grain and pulses to which this invention is applicable include wheat, oats, barley, corn, maize, rice, peas, beans, soyabeans and lentils, and more particularly to grain containing the usual 14–18% of water. The γ-alumina may be incorporated therein by any method which provides adequate distribution in the affected regions, for example by adding the powder to the grain while in a hopper or while flowing in a feeding device, and sometimes sufficient effect is obtained by merely scattering the dust amongst the outer layer when grain is stored in large heaps. The quantity of this γ-alumina required in the grain or pulses depends partly on such factors as the bulk and humidity conditions under which the material is to be stored, and on the degree of infestation of the material. We have found that a quantity between 0.05% and 0.5% by weight of the grain or pulses is generally required, and that 0.1% of the γ-alumina of this invention is as efficient as 1% of the known mineral dusts.

The invention is illustrated but not restricted by the following examples in which the parts are by weight. In these examples, the γ-alumina obtained is tested on grain containing 100 weevils per 100 grams of grain, the weevils being approximately 10 days old at the start of each test; in the absence of any grain dust the mortality does not exceed 2% of the weevils in 23 days, and to obtain a mortality exceeding 90% in 23 days requires 1% of the usual mineral dusts under the conditions of these examples.

*Example 1*

A solution of 105 parts of sodium bicarbonate in 1010 parts of distilled water at 30° C. is vigorously stirred by a stirrer using 2 H. P. per cubic metre of solution, while a solution of 91 parts of sodium aluminate (53% $Al_2O_3$, 42% $Na_2O$) dissolved in 500 parts of distilled water is added at 90° C. in four equal fractions, each fraction being spread over 15 minutes and 20 minute intervals being allowed between additions of each fraction. The magma is then settled for 20 hours and the clear liquor is decanted off. The fine but non-gelatinous precipitate (about 900 parts) is washed by adding distilled water to the settled material to make the quantity up to 2300 parts, heating to 90°–100° C. during 1½ hours, stirring for 1½ hours, and again settling for 20 hours and decanting off the clear liquor. This washing procedure is repeated 8 more times. 3 parts of ammonium carbonate being added during the fifth washing to assist the removal of alkali. The slurry is then filtered giving a filter cake containing 30% $Al_2O_3$ and 0.08% NaOH, which is dried at 110°–120° C. for 48 hours, slowly heated during 24 hours to 350° C. and maintained at 350°–450° C. for a further 17 hours. After disintegrating the chalky solid so obtained, by passing it through a high speed beater mill a powder is obtained (45 parts) consisting of γ-alumina and a small proportion of boehmite in particle size chiefly less than 3 microns diameter.

0.1% of this powder causes 50% mortality of grain weevils in 9 days and 97% mortality in 23 days, when tested by the method given above. 0.07% causes 50% mortality in 11 days, and 0.2% causes 50% mortality in 4 days.

*Example 2*

To a stirred solution of 828 parts of sodium bicarbonate dissolved in 11,000 parts of distilled water is added 1620 parts of a solution containing 14% $Al_2O_3$ and 18.8% $Na_2O$, during 10 minutes while the temperature is 26° C. To the stirred magma is added 17,500 parts of distilled water at 70° C., and this mixture is allowed to settle for 24 hours. The clear liquor is decanted off and the residue made up to 30,000 parts with distilled water at 70° C., stirred, and allowed to settle for 24 hours; this procedure is repeated eight more times, 37 parts of ammonium carbonate being added after the fourth decantation.

The final settled slurry is filtered and the filtercake is dried at 110°–120° C. for 24 hours giving a hard solid (224 parts) which is mixed with 520 parts of water and pulverised while wet in a ball mill for 48 hours. The wet solid is then dried and activated by heating for 6 hours at 380° C. in an oven through which a draught of hot air is allowed to pass; the material is now γ-alumina of average particle diameter less than 3 microns and is incorporated in grain.

0.1% of this powder causes 50% mortality of grain weevils in 9 days and 97% mortality in 23 days. 0.5% of this powder causes 50% mortality of grain weevils in 4 days and 100% mortality in 12 days.

*Example 3*

1000 parts of cold water and 400 parts of sodium aluminate (53% $Al_2O_3$, 42% $Na_2O$) are stirred with a high speed stirrer. The temperature rises to 50°–55° C. and the sodium aluminate substantially dissolves, and at the same time some precipitate of aluminium hydroxide forms. After 2 hours 2,000 parts of cold water is added and the mixture is stirred for 3 hours at 30° C. and then allowed to settle for 24 hours. After decanting the clear liquor, the residue is filtered on a vacuum filter and washed on the filter with hot water. It is then dried at 110°–120° C. and activated at 350°–400° C. for 48 hours, and the chalky solid is disintegrated by passing it through a high speed beater mill. The solid (135 parts) at this stage contains 1% NaOH and is chiefly of particle size between 3 and 6 microns. 0.2% of this substance is incorporated in grain and is an effective grain dust.

Although the invention has been illustrated in these examples with reference to the killing of grain weevils in infested grain, it is equally applicable to the killing of the other insect pests which infest grain, and also to the prevention of infestation of pest-free grain.

What I claim is:

1. The process for combatting insects in grain and pulses which comprises incorporating therein 0.05–0.5% by weight of γ-alumina prepared by precipitating aluminium hydroxide from an alkaline solution of sodium aluminate, washing, drying, and activating the precipitated hydroxide by heating it for 2–24 hours at 250°–500° C., and pulverising it to an average particle size substantially below 10 microns.

2. The process of claim 1 wherein the precipitation of the aluminium hydroxide is effected by diluting the solution of sodium aluminate with water.

3. The process of claim 1 wherein the precipitation of the aluminium hydroxide is effected by the addition of sodium bicarbonate solution to the solution of sodium aluminate.

4. The process of claim 1 in which the precipitation of the aluminium hydroxide is carried out gradually over a period of at least an hour, at 30°–60° C., and is effected in the presence of aluminium hydroxide seed with vigorous stirring.

5. The process of claim 1 in which the pulverising is carried out on an aqueous slurry of the activated aluminium hydroxide for at least 20 hours and subsequently redrying and crushing it.

6. The process of claim 1 in which the activation is carried out in a current of hot air.

CHARLES G. P. FEACHEM.

REFERENCES CITED

The following references are of record in the file of this patent:

UNITED STATES PATENTS

| Number | Name | Date |
|---|---|---|
| 382,505 | Bayer | May 8, 1888 |
| 1,856,194 | Seailles | May 3, 1932 |
| 2,141,132 | Folger | Dec. 20, 1938 |
| 2,146,958 | Kotera | Feb. 14, 1939 |
| 2,203,744 | Peddrick | June 11, 1940 |

OTHER REFERENCES

Kitchener et al., A Simple Method of Protecting Cereals and Other Stored Foodstuffs Against Insect Pests. Chemistry and Industry.

Gregory, Uses and Applications of Chemicals and Related Materials. Reinhold Pub. Corp., 3330 W. 42d St., N. Y., 1939. Page 27.